United States Patent
Sun et al.

[11] Patent Number: 5,702,041
[45] Date of Patent: Dec. 30, 1997

[54] POPOUT STORAGE AND CUPHOLDER ASSEMBLY

[75] Inventors: Andy Kwan-Leung Sun, North York; Bruce H. B. Chow, Scarborough; Edoardo Panziera, Maple, all of Canada

[73] Assignee: Manchester Plastics, Inc., Troy, Mich.

[21] Appl. No.: 617,054

[22] Filed: Mar. 18, 1996

[51] Int. Cl.⁶ .................................................. B60R 7/04
[52] U.S. Cl. .................... 224/539; 224/926; 248/311.2; 297/188.01
[58] Field of Search ............................ 224/926, 275, 224/148.7, 539; 296/37.1; 248/311.2; 206/160, 203, 564; 297/188.01, 188.14; 62/457.2, 457.3, 457.4, 457.5, 457.7

[56] References Cited

U.S. PATENT DOCUMENTS

| | | | |
|---|---|---|---|
| D. 359,266 | 6/1995 | Karp et al. | D12/419 |
| 3,223,280 | 12/1965 | Kazimer | 206/203 |
| 3,454,156 | 7/1969 | Chatten | 206/160 |
| 4,438,637 | 3/1984 | Atkinson | 62/457.5 |
| 4,718,555 | 1/1988 | Amberg | 206/564 |
| 4,919,381 | 4/1990 | Buist | 248/311.2 |
| 5,044,577 | 9/1991 | Spearman | |
| 5,052,649 | 10/1991 | Hunnicut | 248/311.2 |
| 5,104,182 | 4/1992 | Rasnick et al. | |
| 5,108,059 | 4/1992 | Curtis | 248/311.2 |
| 5,150,946 | 9/1992 | Marfilius et al. | |
| 5,170,980 | 12/1992 | Burrows et al. | |
| 5,246,269 | 9/1993 | DeBoer et al. | |
| 5,253,838 | 10/1993 | Spykerman | |
| 5,280,848 | 1/1994 | Moore | |
| 5,280,870 | 1/1994 | Chick et al. | 224/926 |
| 5,297,709 | 3/1994 | Dykstra et al. | |
| 5,330,146 | 7/1994 | Spykerman | |
| 5,337,984 | 8/1994 | Houck | |
| 5,505,417 | 4/1996 | Plocher | 224/926 |
| 5,509,633 | 4/1996 | Ruster et al. | 224/926 |
| 5,522,239 | 6/1996 | Schwartz et al. | 62/457.4 |
| 5,533,700 | 7/1996 | Porter | 224/926 |

*Primary Examiner*—Henry J. Recla
*Assistant Examiner*—Gregory M. Vidovich
*Attorney, Agent, or Firm*—Bliss McGlynn, P.C.

[57] ABSTRACT

A cupholder assembly (10) includes a housing (14) with three intersecting circular cavities (16,18,20) formed therein. The outer two cavities (16,20) may act as receptacles for containers (12). The center cavity (18) includes a removable insert member (30) positioned therein. The insert member (30) includes pivotable arms extending therefrom into the first and third cavities (16,20) to bias containers (12) of varying sizes against their respective cavity (16,20). The insert member (30) may be removed for use of the center cavities (16,18,20) as a storage compartment.

19 Claims, 2 Drawing Sheets

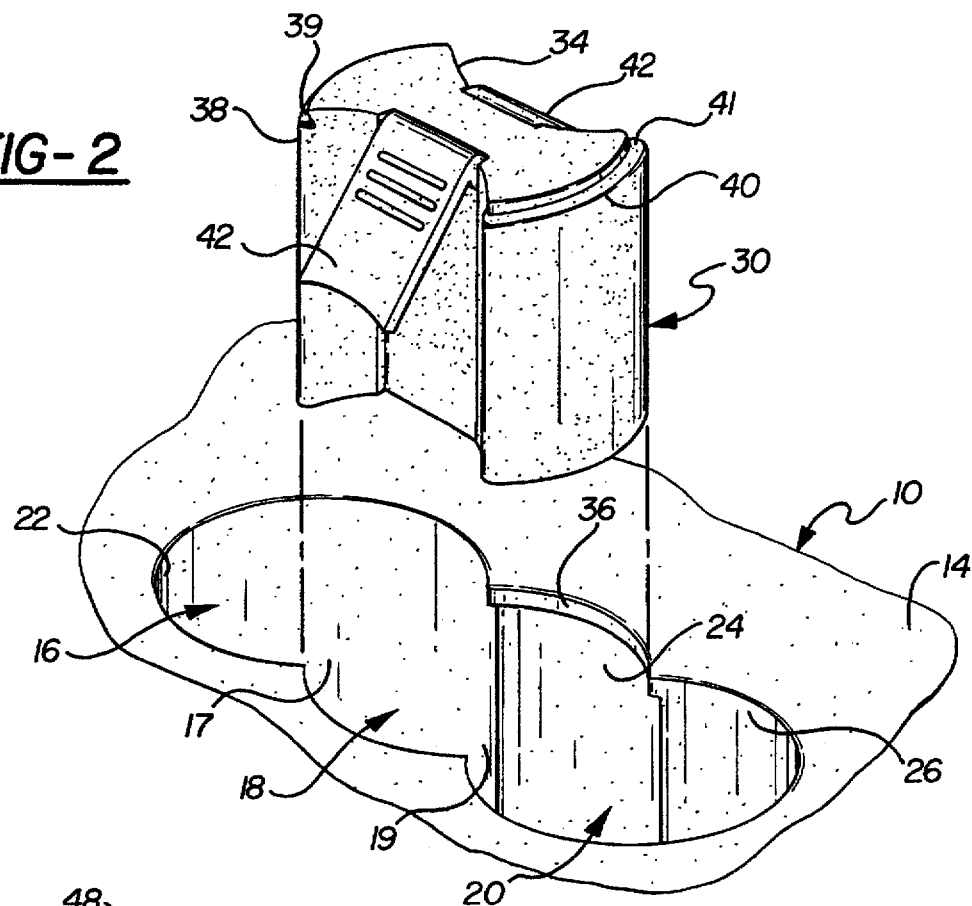
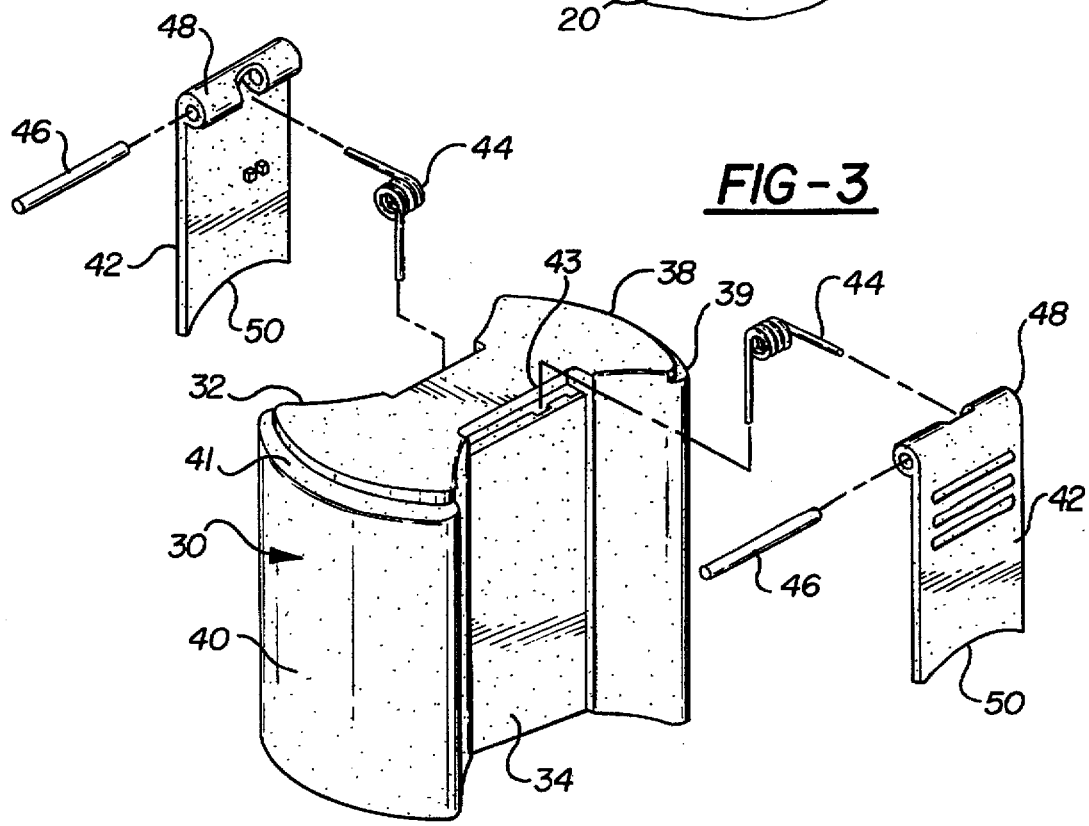

POPOUT STORAGE AND CUPHOLDER ASSEMBLY

BACKGROUND OF THE INVENTION

1. Field of the Invention

The present invention relates generally to cupholder assemblies for holding containers, and more particularly those adapted to be used in vehicles.

2. Description of the Related Art

There is a demand to provide cupholders in vehicles and other seating applications. Cupholders have been located in the center console or arm rest, floor console, and instrument panel. It is also been desirable to provide a cupholder with multiple cavities to receive multiple containers. Furthermore, it has been become important to allow for containers of different sizes to be received in the same cup holder.

U.S. Pat. No. 5,280,848 issued Jan. 25, 1994 in the name of Moore discloses two intersecting circular cavities establishing a pair of container holders.

U.S. Pat. No. 5,337,984 issued Aug. 16, 1994 in the name of Houck discloses a cupholder assembly having multiple apertures formed therein to receive multiple containers. Each of the apertures or container holders are separate from each other.

U.S. Pat. No. 5,150,946 issued Sep. 29, 1992 in the name of Marfilius et al. discloses a pair of intersecting cavities for receiving containers.

U.S. Pat. No. 5,253,838 issued Oct. 19, 1993 in the name of Spykerman discloses an elongated cavity having arcuate cutouts formed on one side to establish the areas for two containers.

U.S. Pat. No. 5,246,269 issued Sep. 21, 1993 in the name of DeDoer et al. discloses two intersecting container holders or receptacles.

U.S. Pat. No. 5,170,980 issued Dec. 15, 1992 in the name of Burrows et al. discloses an enlarged cavity with pivotable arcuate sides to establish separate container holders.

None of the prior art references disclose cupholders formed with a removable insert therebetween which forms a side of the receptacles.

SUMMARY OF THE INVENTION

The invention is a cupholder assembly which comprises a support housing. The support housing includes at least two interconnecting cavities, a first of the cavities providing a first receptacle for a container. An insert member is removeably received within a second of the cavities and fills at least a portion of the second cavity. The insert member includes a first surface providing a portion of the first receptacle when positioned in the second cavity.

The invention also includes the support housing including at least three interconnecting cavities wherein two of the cavities provide receptacles for containers. The remaining of the cavities include an insert member releasably secured therein filling a portion of the cavity.

The invention also includes a pivotable arm pivotally connected to the support surface of the support housing and extending outwardly into the first receptacle to provide support against the container at various outward positions.

BRIEF DESCRIPTION OF THE DRAWINGS

Advantages of the subject invention will be readily appreciated as the same becomes better understood by reference to the following detailed description when considered with the accompanying drawings wherein:

FIG. 2 is a perspective view of the insert member being removed from the support housing; and FIG. 3 is an exploded view of the insert member.

DESCRIPTION OF THE PREFERRED EMBODIMENT(S)

Figure 1:
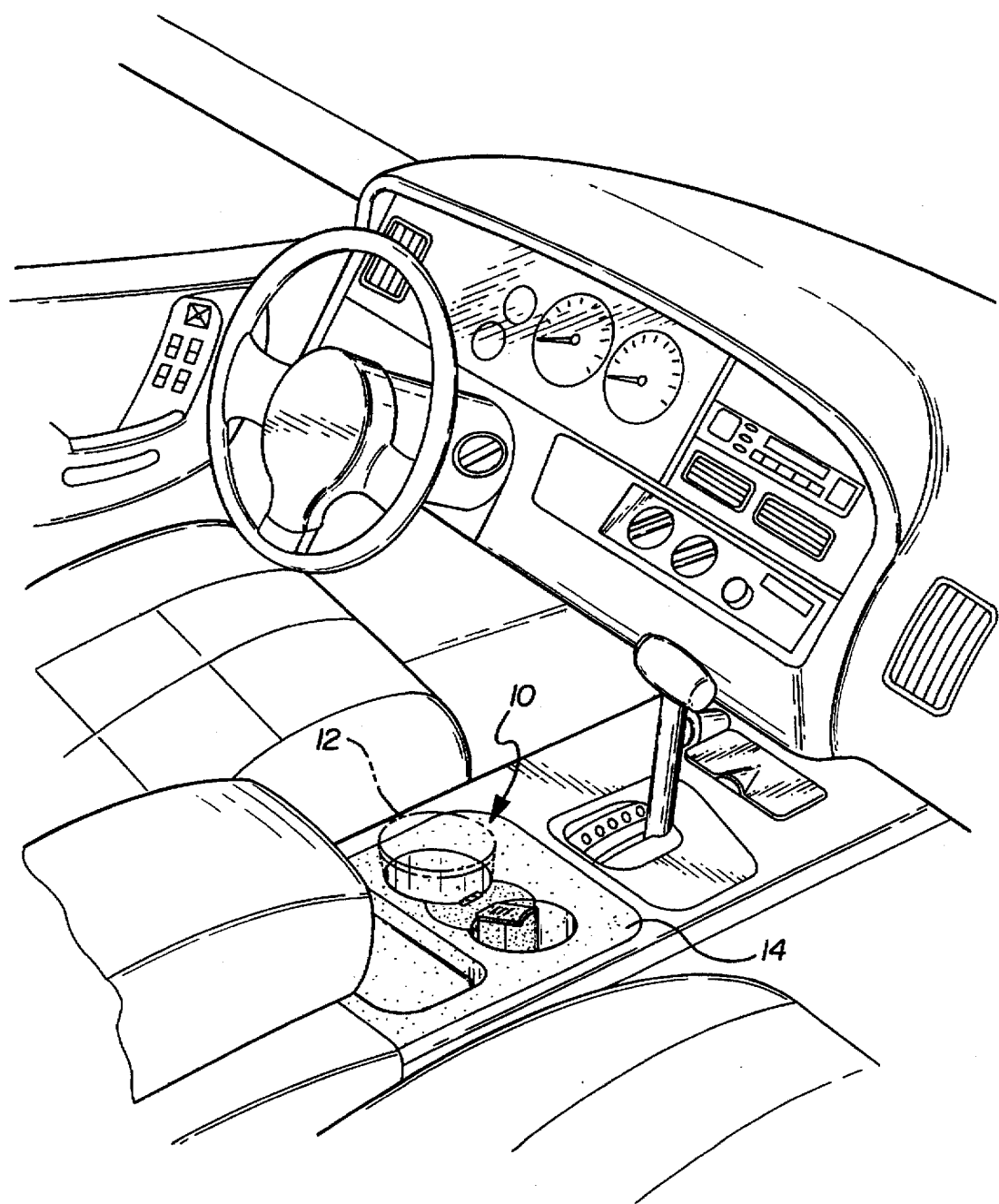
FIG. 1 is a general perspective view of the cupholder assembly as used in a vehicle.

A cupholder assembly 10 is generally illustrated in FIG. 1 and more particularly in FIGS. 2–3. The cupholder assembly 10 can support a plurality of containers or cups 12. Though the cupholder assembly 10 is illustrated for use in a vehicle, it is to be understood that the cupholder assembly 10 may be utilized in other applications based on the teachings of this invention.

The cupholder assembly 10 includes a support housing 14. The support housing 14 includes first, second, and third cavities 16,18,20 formed therein. Each of the first, second and third cavities 16,18,20 are generally cylindrical in shape whose circumferences intersect with one another thereby providing gaps or channels 17,19 between the cavities 16,18,20. More particularly, each of the cavities 16,18,20 includes at least a partial perimeter wall 22,24,26. The perimeter walls 22,24,26 are of circular contour to support the containers 12 of various contours.

The cupholder assembly 10 also includes an insert member 30 removeably received within the second cavity 18 and filling or extending at least a portion of the second cavity 18. The insert member 30 includes first and second sides 32,34 which provide portions of the first and second cavities 16,20 or receptacles, respectively, to support containers 12 therein. In the preferred embodiment, the first and second sides 32,34 are arcuate in shape and concave to complement the circular contour of the perimeter walls 22,26. The insert member 30 is also generally cylindrical in shape to securely fit within the second cavity 18 to allow rotational movement of the insert member 30 therein. The first and second sides 32,34 are cut out of the cylindrical shape.

The insert member 30 is releasably secured within the second cavity 18. The insert member 30 may be removed from the second cavity 18 to allow use of the second cavity 18 as an open storage compartment. The support housing 14 includes a lip 36 overhanging the second cavity 18. The insert member 30 includes outer ends 38,40 with the first and second sides 32,34 extending therebetween. The outer ends 38,40 are placed adjacent the perimeter walls 24 of the second cavity 18 when inserted therein. The lip 36 over hangs the walls 24 to lock and secure the outer ends 38,40 thereto. The insert member 30 can be rotated within the second cavity 18 so that the outer ends 38,40 are moved toward the first and third cavities 16,20 to disengage the lip 36 (FIG. 2) so that the insert member 30 can be removed. The outer ends 38,40 include a shoulder 39,41 formed at the upper edge thereof to be locked by the lip 36 preventing removal of the insert member 30, and so that the upper surface of the insert member 30 is flushed with the support housing 14.

The insert member 30 also includes a pair of pivotable support arms 42 extending outwardly from each of the center area of the first and second sides 32,34 into the first and third cavities 16,20 to provide biased support against the container 12 at various angular positions. The arms 42 are connected to the insert member 30 by biasing members 44, typically a spring, to allow the arm 42 to be biased into the first and second cavity 16,20 and resiliently repositioned depending on the size of the container 12 disposed therein. The biasing member 44 is connected to the arm 42 by a pin 46 threaded through a tubular portion 48 on the pivoting end of each arm 42. An arm channel 45 is formed by a pair of molded pins to hold the spring end stationary. The other end of the biasing member 42 is connected within a channel 43 of the insert member 30. The arms 42 include an outward end 50 having an arcuate or concave shape to complement circular containers 12. The arms 42 in their fully Biased positions extend outwardly into the receptacles provided by the first and second cavities 16,20 approximately at a 90 degree angle. The arms 42 may be pivoted further downwardly between the 90 degree angle to 0 degree adjacent the first and second sides 32,34. This allows biasing against the container 12 (of different size) within the cavities 16,20 to prevent movement or rattling of the container 12 therein. Containers 12 of different sizes can therefore be used.

In operation, a user may insert containers 12 in any of the first or third cavities 16,20 when the insert member 30 is positioned in the second cavity 18. If a user desires to use an open storage compartment, the insert member 20 is removed by rotating the insert member 30 approximately 90° so that the lip 36 is disengaged by the insert member 30. Thereafter, the insert member 30 is pulled out of the second or center cavity 18. Items may be placed in all of the cavities 16,18,20. The insert member 30 may be replaced by again inserting the member 30 in the second cavity 18 with the ends 38,40 extending in the first and third cavities 16,20. Thereafter the insert member 30 is rotated 90° to lock with the lip 36.

The cupholder assembly 10 may be molded of rigid plastic by any suitable process, excluding the spring It is to be appreciated that other materials may be used.

It should also be understood that, though the assembly 10 is illustrated for use in a center floor console, that the assembly 10 may be used in any location or application.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A cup holder assembly comprising:
a support housing,
said support including at least two interconnecting cavities, a first of said cavities providing a first receptacle for a container;
an insert rod tuber removably received within a second of said cavities and which fills at least a portion of said second cavity, and, including a first side providing a portion of said first receptacle for the container when positioned in said second cavity;
said support housing including a locking member interconnectable with said insert member having a latch position fixedly securing said insert member into said second cavity and an unlatch position allowing removal of said insert member, said insert member being rotatable within said second cavity between said latch position with said first side forming a portion of said receptacle and said unlatch position; and
said locking member including a lip on said support housing overhanging said second cavity and a portion of said insert member when in said latch position.

2. An assembly as set forth in claim 1 wherein said first cavity includes at least a partial perimeter wall of circular contour.

3. An assembly as set forth in claim 2 wherein said first side is of arcuate contour complementing said perimeter wall.

4. An assembly as set forth in claim 1 further including a third cavity interconnecting said second cavity, said third cavity providing a second receptacle for a container.

5. An assembly as set forth in claim 4 wherein said insert member includes a second side establishing a portion of said second receptacle.

6. An assembly as set forth in claim 5 wherein said second cavity includes at least a partial second perimeter wall of circular contour.

7. An assembly as set forth in claim 6 wherein said second side is of arcuate contour complimenting said second perimeter wall of said second cavity.

8. An assembly as set forth in claim 3 wherein said insert member includes a biasing arm extending outwardly from said insert member at said first side to contact a container placed within said first receptacle.

9. An assembly as set forth in claim 8 wherein said insert member includes a biasing member interconnecting said biasing arm to said insert member to allow said biasing arm to be biased into said first receptacle and resiliently repositioned depending on the size of the container.

10. An assembly as set forth in claim 1 wherein said insert member includes outer ends, said outer ends adjacent walls of said second cavity.

11. A cupholder assembly comprising:
a support housing;
said support housing including at least two interconnecting cavities, a first of said cavities providing at least one receptacle for containers;
an insert member releasably secured within a second of said cavities filling at least a portion of said second cavity and including a first side providing a portion of said first cavity;
said insert member including a biasing arm extending outwardly from said insert member at said first side to contact a container placed within said first receptacle;
said support housing including a locking member interconnectable with said insert member, said insert member being rotatable within said second cavity between a latch position fixedly securing said insert member into said second cavity with said first side forming a portion of said first receptacle and an unlatch position allowing removal of said insert member.

12. An assembly as set forth in claim 11 wherein said insert member includes a biasing member interconnecting said biasing arm to said insert member to allow said biasing arm to be biased into said first receptacle and resiliently repositioned depending on the size of the container.

13. An assembly as set forth in claim 11 wherein said insert member includes outer ends, said outer ends adjacent walls of said second cavity;
said locking member includes a lip on said support housing overhanging said second cavity and outer ends of said insert when in said latch position.

14. A cupholder assembly comprising:
a support housing;
said support housing including at least two interconnecting cavities, a first of said cavities providing at least one receptacle for a container;
an insert member releasably secured within a second of said cavities filling at least a portion of said second cavity and including a first side providing a portion of said first cavity wherein said first cavity includes at least a partial perimeter wall of substantially circular contour, said first side is of arcuate contour complimenting said perimeter wall and providing a portion of said first cavity for the container when positioned in said second cavity;

said insert member including a biasing arm extending outwardly from said insert member at said first side to contact a container placed within said first receptacle;

said insert member includes a second side establishing a portion of said second cavity;

said second cavity includes at least a partial parameter wall of circular contour.

15. A cupholder assembly comprising:

a support housing;

said support housing including at least one cavity providing a first receptacle for a container and a second cavity interconnecting said first cavity, said first receptacle including support surfaces for supporting the container;

an insert member removably received within said second cavity;

said support housing including a locking member interconnecting with said insert member to fixedly secure said insert member into said second cavity in a latch position with said sides forming a portion of said receptacles and an unlatch position allowing removal of said insert member in an unlatch position, said insert member being rotatable within said second cavity said latch position fixedly securing said insert member into said cavity and said unlatch position.

16. An assembly as set forth in claim 15 wherein said insert member includes outer ends with said sides extending therebetween, said outer ends adjacent walls of said second cavity;

said locking member includes a lip on said support housing overhanging said second cavity and outer ends of said insert when in said latch position.

17. An assembly as set forth in claim 15 wherein said pivotal arm includes a biasing spring interconnecting said arm and said insert member.

18. An assembly as set forth in claim 17 wherein said arm extends in a downward and outward direction and can be biased downwardly.

19. A cupholder assembly comprising:

a support housing;

said support housing including at least two interconnecting cavities, a first of said cavities providing at least one receptacle for a container;

an insert member releasably secured within a second of said cavities filling at least a portion of said second cavity and including a first side providing a portion of said first cavity;

said insert member including a biasing arm extending from said insert member at said first side to contact a container placed within said first receptacle, wherein said insert member is rotatable within said second cavity to allow rotation of said first side to adjacent said first cavity.

\* \* \* \* \*

UNITED STATES PATENT AND TRADEMARK OFFICE
CERTIFICATE OF CORRECTION

PATENT NO. : 5,702,041
DATED : December 30, 1997
INVENTOR(S) : Andy Kwan-Leung Sun et al.

It is certified that error appears in the above-indentified patent and that said Letters Patent is hereby corrected as shown below:

Page 1, under "ABSTRACT" line 6, after "arms" insert -- (42) --.

Column 3, line 10, "Biased" should be -- biased --.

Column 3, line 33, after "spring" insert -- 44 --.

Column 3, claim 1, line 3, after "support" insert -- housing --.

Column 3, claim 1, line 6, delete "rod tuber" and insert therefor -- member --.

Column 5, claim 15, line 15, after "cavity" insert -- between --.

Signed and Sealed this

Seventh Day of July, 1998

*Attest:*

*Attesting Officer*

BRUCE LEHMAN

*Commissioner of Patents and Trademarks*